United States Patent
Moon

(10) Patent No.: US 12,269,412 B2
(45) Date of Patent: Apr. 8, 2025

(54) SIDE AIRBAG

(71) Applicant: HYUNDAI MOBIS CO., LTD., Seoul (KR)

(72) Inventor: Geon Woong Moon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/592,883

(22) Filed: Mar. 1, 2024

(65) Prior Publication Data
US 2025/0074350 A1  Mar. 6, 2025

(30) Foreign Application Priority Data
Sep. 6, 2023  (KR) ......................... 10-2023-0118426

(51) Int. Cl.
*B60R 21/231* (2011.01)
*B60R 21/2338* (2011.01)
*B60R 21/2346* (2011.01)

(52) U.S. Cl.
CPC .... *B60R 21/23138* (2013.01); *B60R 21/2338* (2013.01); *B60R 21/2346* (2013.01); *B60R 2021/23146* (2013.01); *B60R 2021/23382* (2013.01)

(58) Field of Classification Search
CPC .... B60R 21/23138; B60R 2021/23146; B60R 21/2338; B60R 2021/23382; B60R 21/207; B60R 21/233; B60R 2021/23107; B60R 2021/23308; B60R 2021/23324
See application file for complete search history.

(56) References Cited

U.S. PATENT DOCUMENTS

| | | | |
|---|---|---|---|
| 2013/0197764 A1* | 8/2013 | Thomas | B60R 21/0136 701/45 |
| 2016/0107601 A1* | 4/2016 | Suk | B60R 21/232 280/729 |
| 2017/0182962 A1* | 6/2017 | Hiraiwa | B60R 21/2346 |
| 2021/0094505 A1* | 4/2021 | Yamamoto | B60R 21/2338 |
| 2021/0354652 A1* | 11/2021 | Gerlach | B60R 21/23138 |
| 2024/0208451 A1* | 6/2024 | Takasawa | B60R 21/2338 |

FOREIGN PATENT DOCUMENTS

| | | | | |
|---|---|---|---|---|
| WO | WO-2010086124 A1 * | 8/2010 | ......... | B60R 21/207 |
| WO | WO-2015124164 A1 * | 8/2015 | ....... | B60R 21/23138 |
| WO | WO-2019026538 A1 * | 2/2019 | ......... | B60R 21/207 |
| WO | WO-2021166530 A1 * | 8/2021 | ......... | B60R 21/207 |

* cited by examiner

*Primary Examiner* — Paul N Dickson
*Assistant Examiner* — Matthew D Lee
(74) *Attorney, Agent, or Firm* — NSIP Law

(57) ABSTRACT

A side airbag installed on a side surface, which faces a passenger seat, of a seatback of a driver's seat, is provided. The side airbag includes a main cushion provided with a flow hole and expandible by gas, and a sub-cushion that is attached to the main cushion, the sub-cushion being connected to the flow hole. When the main cushion expands after the airbag is actuated, the sub-cushion protrudes from the main cushion while being expanded by the gas supplied through the flow hole, and as the main cushion expands, the main cushion is deployed toward a front side of a vehicle between the driver's seat and the passenger seat, and the sub-cushion protrudes from a rear side of the main cushion toward a rear side of the vehicle.

18 Claims, 7 Drawing Sheets

SIDE AIRBAG

CROSS-REFERENCE TO RELATED APPLICATION

This application claims priority to and the benefit of Korean Patent Application No. 10-2023-0118426, filed on Sep. 6, 2023, in the Korean Intellectual Property Office, the disclosure of which is incorporated herein by reference in its entirety for all purposes.

BACKGROUND

1. Field

The present invention relates to a side airbag, and more particularly, to a center side airbag disposed between a driver's seat and a passenger seat.

2. Description of Related Art

In general, when a car accident occurs, an airbag protects an occupant by rapidly ejecting gas and rapidly inflating a deflated airbag in response to a signal from a collision sensor. As airbags, there are a driver airbag mounted on a steering wheel, a passenger airbag mounted on an upper side of a glove box, a curtain airbag mounted along a roof rail, and a side airbag mounted on a side of a seat.

Among them, the side airbag is a device that expands and deploys forward from a side of a seat bag to protect the side of an occupant from the chest to the buttocks. In particular, a center side airbag is disposed between an occupant seated on a driver's seat and an occupant seated on a passenger seat in the event of a side collision of a vehicle to protect the occupants from colliding with each other.

However, as the number of vehicles to which support structures such as seat armrests and center consoles are not applied has increased recently, a structural problem has occurred in which an airbag does not receive sufficient support and falls down toward a seat next thereto, resulting in a problem of not safely protecting occupants.

SUMMARY

The present invention is directed to providing a side airbag that receives sufficient support when the side airbag is deployed from a seatback.

The object of the present invention is not limited to the above-described object, and other objects not described will be clearly understood by those skilled in the art from the description below.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a side airbag installed on a side surface, which faces a passenger seat, of a seatback of a driver's seat, includes: a main cushion provided with a flow hole and expandible by gas; and a sub-cushion that is attached to the main cushion, the sub-cushion being connected to the flow hole, wherein, when the main cushion expands after the airbag is actuated, the sub-cushion protrudes from the main cushion while being expanded by the gas supplied through the flow hole, and wherein, as the main cushion expands, the main cushion is deployed toward a front side of a vehicle between the driver's seat and the passenger seat, and the sub-cushion protrudes from a rear side of the main cushion toward a rear side of the vehicle.

The main cushion may include a structure in which a first panel facing the driver's seat and a second panel facing the passenger seat are connected to be left and right symmetrical based on a central folding line; and the flow hole may be formed in a structure that passes through a portion of each of the first panel and the second panel at the folding line.

A center of the flow hole may be located on the folding line.

The sub-cushion may be formed by flattening two cut sub-panels in contact with each other and sewing edges of the sub-panels, and the side airbag may further comprise a connecting hole formed in any one of the sub-panels, the connecting hole for connecting to the flow hole.

The sub-cushion may be coupled to the main cushion by being joined along circumferences of the connecting hole and the flow hole in a state in which the connecting hole overlaps and is connected to the flow hole.

The side airbag may further include a tether that is provided inside the main cushion, wherein the tether may limit an expansion thickness of the main cushion.

The tether may be located at the same level as the flow hole or at a higher level than the flow hole based on a vertical direction of the main cushion, and the tether may be disposed in a long structure that extends left and right in a width direction of the main cushion.

The tether may be deployed by the expansion of the main cushion and disrupt a flow of the gas so as to allow the gas to be supplied to the sub-cushion through the flow hole.

The side airbag may further include a diffuser pocket that is provided in the main cushion and accommodates an inflator, wherein the diffuser pocket may be disposed below the flow hole.

In a console mode in which a seatback of a center seat disposed between the driver's seat and the passenger seat is folded, the sub-cushion may be located at a higher level than a back surface of the seatback, and in a backrest mode in which the seatback of the center seat is unfolded, the sub-cushion may be located between the main cushion and a front surface of the seatback.

In another general aspect of the disclosure, a side airbag installed on a side surface, which faces a driver's seat, of a seatback of a passenger seat, includes: a main cushion provided with a flow hole and expandible by gas; and a sub-cushion that is attached to the main cushion, the sub-cushion being connected to the flow hole, wherein, when the main cushion expands after the airbag is actuated, the sub-cushion protrudes from the main cushion while being expanded by the gas supplied through the flow hole, and wherein, as the main cushion expands, the main cushion is deployed toward a front side of a vehicle between the driver's seat and the passenger seat, and the sub-cushion protrudes from a rear side of the main cushion toward a rear side of the vehicle.

The main cushion may include a structure in which a first panel facing the passenger seat and a second panel facing the driver's seat are connected to be left and right symmetrical based on a central folding line; and the flow hole may be formed in a structure that passes through a portion of each of the first panel and the second panel at the folding line.

Figure 1:
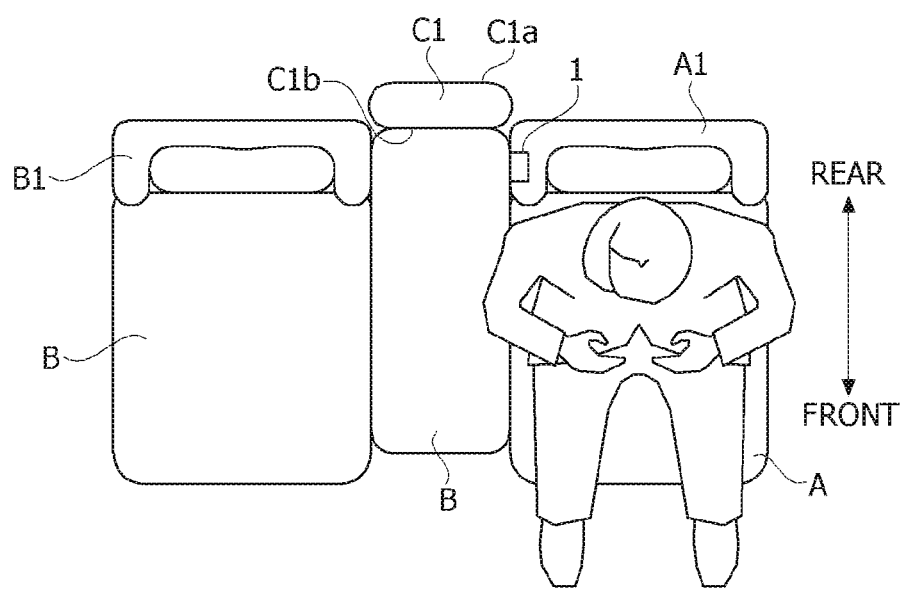
FIG. 1 is a schematic diagram showing a state in which a side airbag according to an embodiment of the present invention is installed on a seatback of a driver's seat.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present invention will be described in detail with reference to the accompanying drawings, and components which are the same or correspond to each other will be denoted by the same or corresponding reference numerals in all drawings, and redundant descriptions will be omitted.

Figure 2:
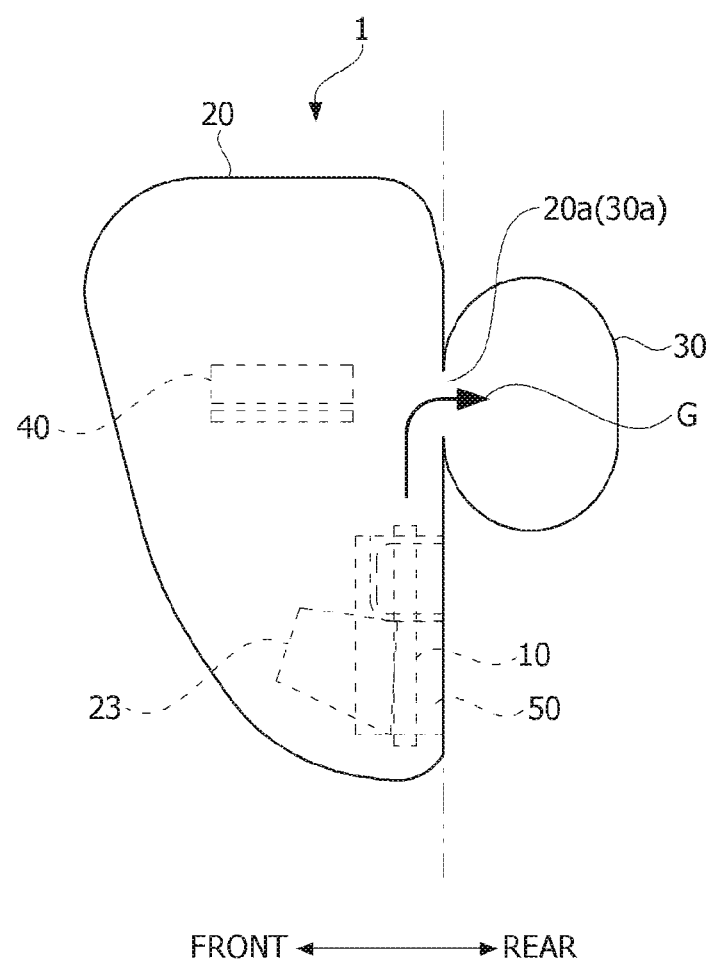
FIG. 2 is a schematic diagram showing a state in which the side airbag according to the embodiment of the present invention is deployed.
Figure 3:
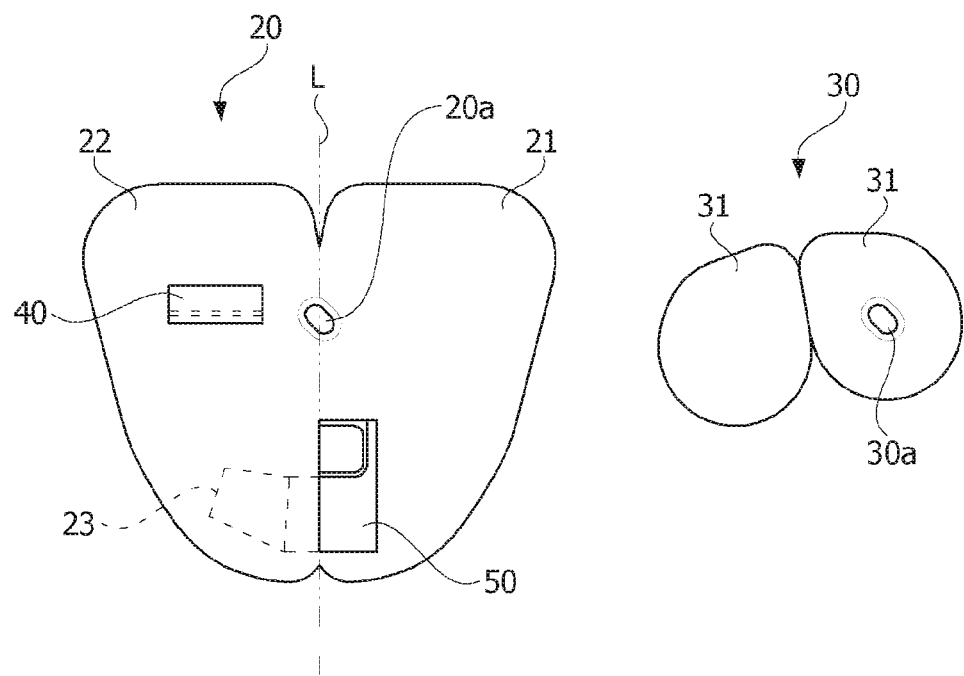
FIG. 3 is a schematic diagram showing first and second panels that constitute a main cushion and panels that constitute a sub-cushion in the side airbag.
Figure 4:
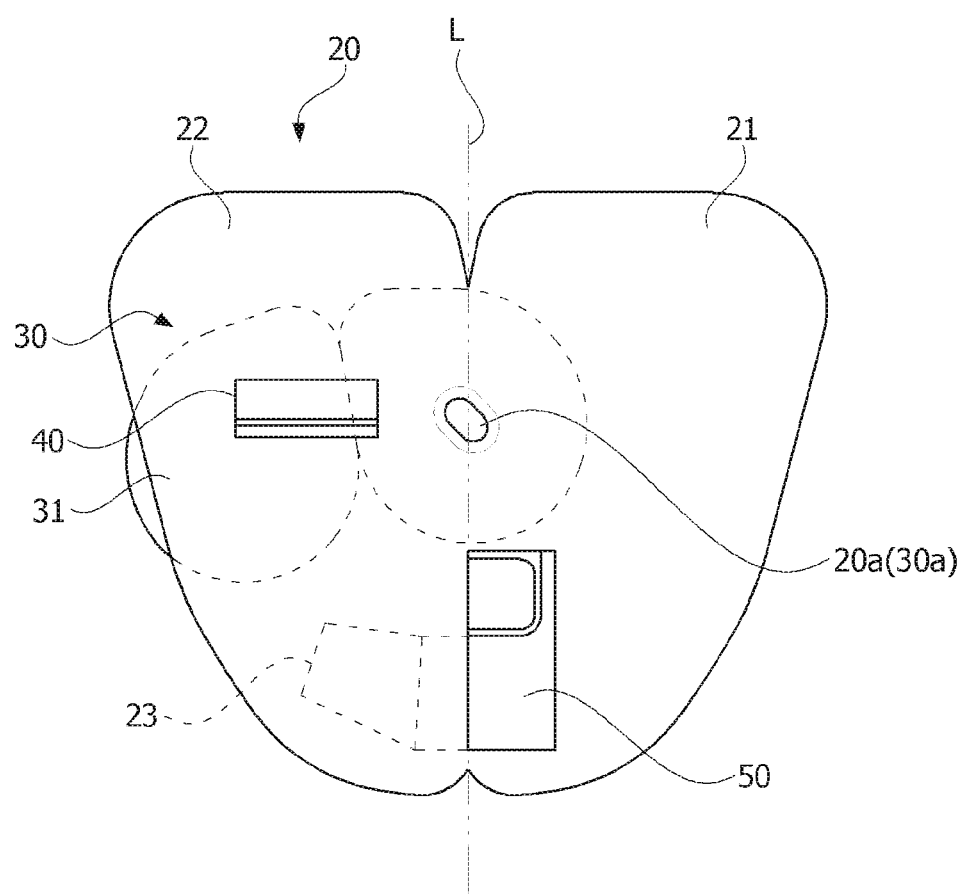
FIG. 4 is a diagram showing a state in which the sub-cushion is coupled with the main cushion.
Figure 5:
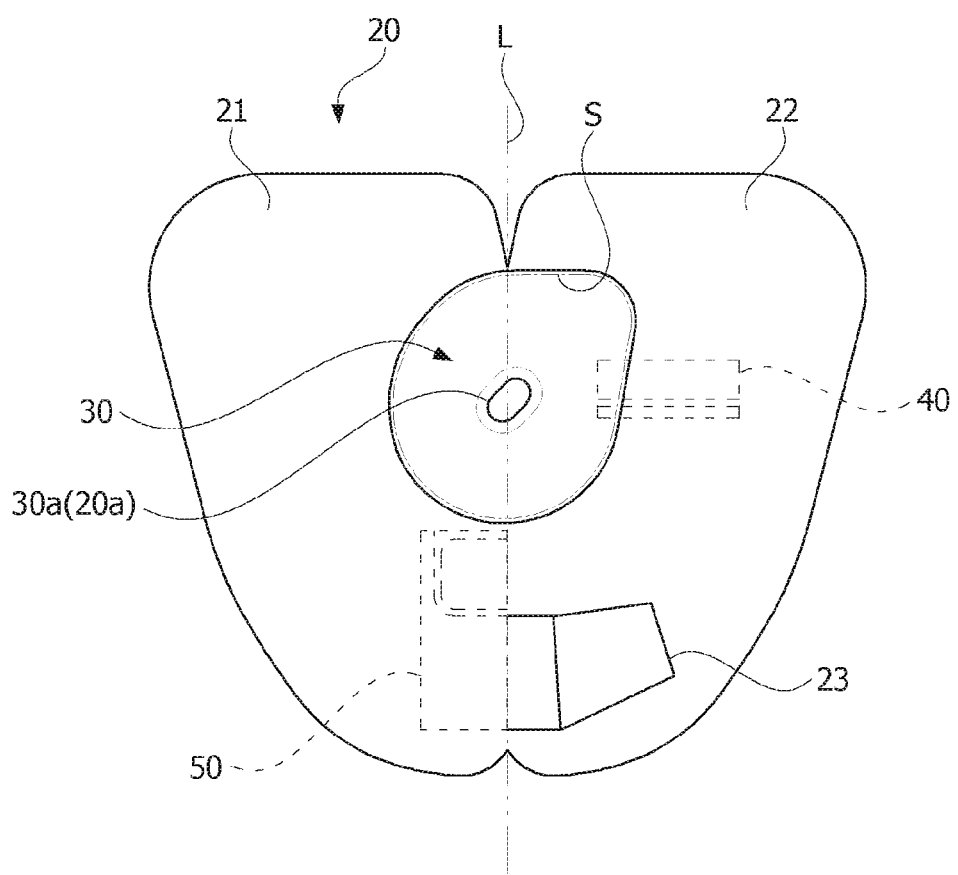
FIG. 5 is a diagram showing a state of the sub-cushion formed by joining the panels.
Figure 6:
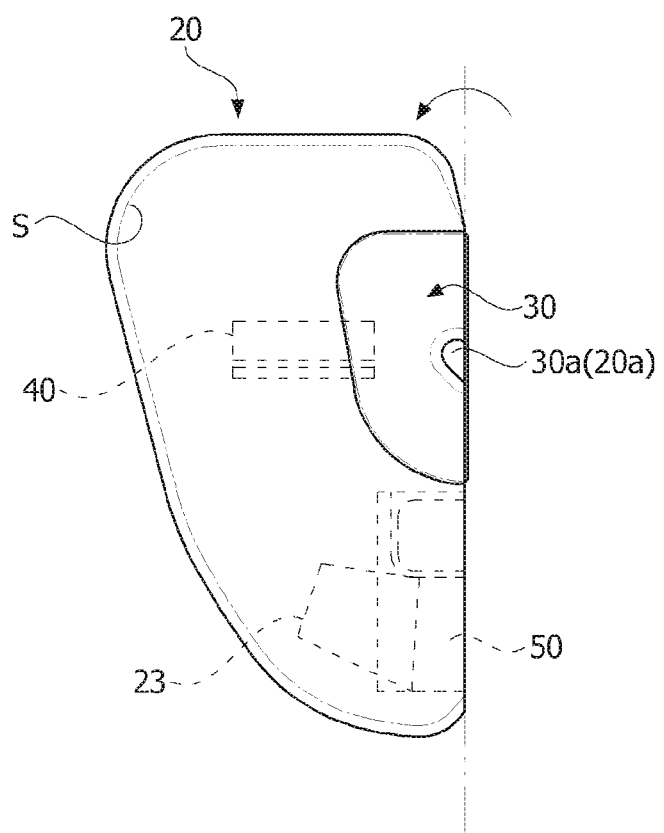
FIG. 6 is a diagram showing a state of the main cushion formed by joining the first panel and the second panel.
Figure 7A:
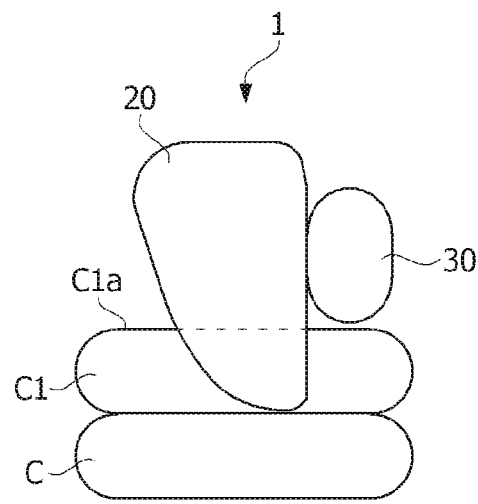
FIGS. 7A and 7B are diagrams showing a state in which the main cushion and the sub-cushion are deployed in a state in which a center seat is in a console mode and a backrest mode, respectively.
Figure 7B:
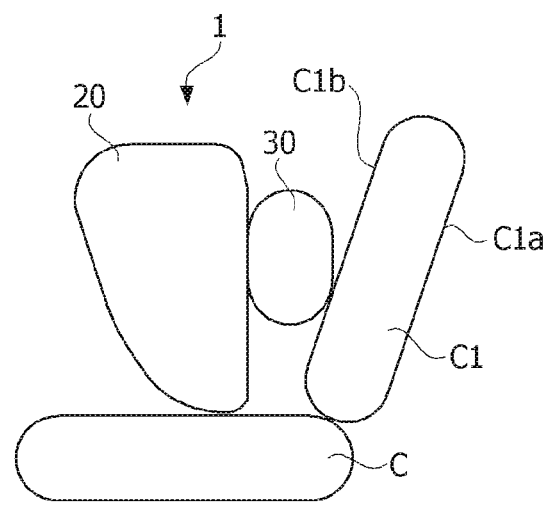

FIG. 1 is a schematic diagram showing a state in which a side airbag according to an embodiment of the present invention is installed on a seatback of a driver's seat, FIG. 2 is a schematic diagram showing a state in which the side airbag according to the embodiment of the present invention is deployed, FIG. 3 is a schematic diagram showing first and second panels that constitute a main cushion and panels that constitute a sub-cushion in the side airbag, FIG. 4 is a diagram showing a state in which the sub-cushion is coupled with the main cushion, and FIG. 5 is a diagram showing a state of the sub-cushion formed by joining the panels, FIG. 6 is a diagram showing a state of the main cushion formed by joining the first panel and the second panel. FIGS. 7A and 7B are diagrams showing a state in which the main cushion and the sub-cushion are deployed in a state in which a center seat is in a console mode and a backrest mode, respectively.

A side airbag 1 according to the embodiment of the present invention is installed on a seatback A1 of a driver's seat A of a vehicle, and may protect an occupant when a vehicle collision accident occurs. In this case, the side airbag 1 may be installed on a side surface, which faces a passenger seat B, of the seatback A1 of the driver's seat A. (Alternatively, the side airbag 1 may be installed on a side surface, which faces a driver's seat A, of the seatback B1 of the passenger seat B).

A center seat C instead of the conventional fixed center console may be disposed between the driver's seat A and the passenger seat B.

A seatback C1 of the center seat C may serve as a center console by being disposed with a back surface C1a facing upward in a flat-folded console mode. Additionally, the seatback C1 of the center seat C may serve as an auxiliary seat by being disposed with a front surface C1b facing the front of the vehicle in an unfolded backrest mode.

Referring to the drawings, the side airbag 1 according to the embodiment of the present invention may include a main cushion 20 and a sub-cushion 30.

The main cushion 20 is provided with a flow hole 20a and may be expanded by gas.

An inflator 10 may be provided in the main cushion 20. In this case, the inflator 10 may be disposed at a lower portion of the main cushion 20 in the main cushion 20. Also, the flow hole 20a may be disposed above the inflator 10.

The main cushion 20 is installed on the side surface of the seatback A1 of the driver's seat A and may be expanded by the gas G discharged from the inflator 10 and deployed from the side surface of the seatback A1 toward the front of the vehicle. In addition, the main cushion 20 is disposed between the driver's seat A and the passenger seat B to protect occupants by absorbing a mutual impact between the occupants of the driver's seat A and the passenger seat B.

Referring to the drawings, the main cushion 20 may include a first panel 21 facing the driver's seat A and a second panel 22 facing the passenger seat B. The first panel 21 and the second panel 22 may be made of a flexible fabric material, but are not limited thereto.

The main cushion 20 may have a single panel structure in which the first panel 21 and the second panel 22 are connected to be left and right symmetrical based on a central folding line L. Also, in a state in which the first panel 21 and the second panel 22 are folded along the folding line L and overlap each other, the main cushion 20 may be formed by sewing an edge of the first panel 21 and an edge of the second panel 22 along a seam line S.

In this embodiment, the first panel 21 and the second panel 22 are provided as an integrally connected single panel structure, but are not limited thereto. For example, the first panel 21 and the second panel 22 may be formed separately from each other and provided in a separated state.

The flow hole 20a may be formed in a structure that passes through a portion of each of the first panel 21 and the second panel 22 at the folding line L. Therefore, a center of the flow hole 20a may be located on the folding line L. In this case, the flow hole 20a may be disposed at an upper portion of the main cushion 20 along the folding line L.

In an embodiment, one of the first panel 21 and the second panel 22 may be provided with a strap 23 on the outer surface thereof for roll-folding and fixing the main cushion 20.

In a state in which the main cushion 20 is roll-folded to be mounted on the seatback A1, the strap 23 wraps around the periphery of the main cushion 20 and serves to restrain the main cushion 20 from coming loose. Also, the strap 23 may be broken when the main cushion 20 expands.

The sub-cushion 30 may be provided in a structure by being attached to the main cushion 20 and connected to the flow hole 20a.

Referring to the drawings, the sub-cushion 30 may be formed by flattening two panels 31 cut into predetermined shapes in contact with each other and sewing edges of the two panels 31 along the seam line S. In this case, the sub-cushion 30 may be formed to have a relatively smaller volume than the main cushion 20.

The panels 31 may be made of the flexible fabric material, but are not limited thereto.

A connecting hole 30a may be formed in any one of the panels 31 constituting the sub-cushion 30, that is, the panel 31 joined to the main cushion 20. The connecting hole 30a may overlap and be connected to the flow hole 20a when the panel 31 of the sub-cushion 30 is joined to the main cushion 20.

The sub-cushion 30 may be coupled to the main cushion 20 by being joined along the circumferences of the flow hole 20a and the connecting hole 30a in a state in which the connecting hole 30a overlaps and is connected to the flow hole 20a.

The sub-cushion 30 is expanded by gas supplied through the flow hole 20a and the connecting hole 30a as the main cushion 20 expands and may be configured to protrude outward from the main cushion 20. In an embodiment, the sub-cushion 30 may protrude toward the rear of the vehicle from the folding line L, which is the rear of the main cushion 20.

In detail, as shown in FIG. 7A, in a console mode in which the seatback C1 of the center seat C is folded, the sub-cushion 30 protruding from the main cushion 20 may be located at a higher level than the back surface C1a of the seatback C1. That is, when the seatback C1 of the center seat C is folded and serves as a center console, the sub-cushion 30 is located above the back surface C1a of the seatback C1 in an inflated state. Accordingly, the main cushion 20 may be implemented in a structure in which the side thereof is supported by the side surface of the seatback C1 of the center seat C corresponding to the center console and is additionally supported by the back surface C1a of the seatback C1 through the sub-cushion 30.

In addition, as shown in FIG. 7B, in backrest mode in which the seatback C1 of the center seat C is unfolded, the sub-cushion 30 protruding from the main cushion 20 may be located between the main cushion 20 and the front surface C1b of the seatback C1. That is, when the seatback C1 of the center seat C is unfolded and serves as an auxiliary seat, the sub-cushion 30 is located on the front surface C1b of the seatback C1 in an inflated state. Accordingly, the main cushion 20 may be implemented in a structure in which the rear thereof is supported by the front surface C1b of the seatback C1 through the sub-cushion 30.

Meanwhile, a tether 40 and a diffuser pocket 50 may be provided inside the main cushion 20.

The tether 40 may limit an expansion thickness of the main cushion 20.

The tether 40 may be made of a flexible fabric material like the main cushion 20 and may be sewn and coupled to the inner surface of the main cushion 20.

The tether 40 may be located at the same level as the flow hole 20a or at a higher level than the flow hole 20a based on the vertical direction of the main cushion 20, and may be disposed in a long structure that extends left and right in a width direction of the main cushion 20. In addition, both ends of the tether 40 in a width direction may be fixedly attached to the inner surface of the main cushion 20. Accordingly, the expansion thickness of the main cushion 20 may be limited by as much as the width of the tether 40.

The tether 40 is deployed by the expansion of the main cushion 20 and disrupts the flow of gas G, thereby allowing the gas G to be supplied to the sub-cushion 30 through the flow hole 20a. That is, in a process where the gas G discharged from the inflator 10 spreads and moves to the upper portion of the main cushion 20, upward movement is hindered by the tether 40, causing some of the gas G to be retained below the tether 40. Additionally, the inflow of gas G increases toward the flow hole 20a along the deployed tether 40.

Therefore, the tether 40 is near the flow hole 20a and allows the gas G to be supplied to the sub-cushion 30 through the flow hole 20*a*, thereby allowing the sub-cushion 30 to expand quickly. Also, gas G that bypasses the tether 40 moves to the upper portion of the main cushion 20 and expands the main cushion 20.

The diffuser pocket 50 is disposed in a structure that extends in the vertical direction of the main cushion 20 in the main cushion 20 and may have a structure having open upper and lower portions. In this case, the diffuser pocket 50 may be disposed below the flow hole 20*a*.

The inflator 10 has a structure that extends up and down and is accommodated in the diffuser pocket 50, and the gas G discharged from the inflator 10 may be distributed inside the main cushion 20 through the open upper and lower portions of the diffuser pocket 50.

According to an embodiment of the present invention, a side airbag can be provided to receive sufficient support when the side airbag is deployed from a seatback.

The effects of the present invention are not limited to the above-described effects, and other effects that are not described will be clearly understood by those skilled in the art from the description of the claims.

Although the present invention has been described above with reference to embodiments, it should be understood that those skilled in the art may modify the present invention in various ways without departing from the spirit and scope of the present invention as set forth in the claims below. Further, the differences related to these modifications and changes should be construed as being included in the scope of the present invention as defined in the appended claims.

What is claimed is:

1. A side airbag installed on a side surface, which faces a passenger seat, of a seatback of a driver's seat, the side airbag comprising:
   a main cushion provided with a flow hole and expandable by gas; and
   a sub-cushion that is attached to the main cushion, the sub-cushion being connected to the flow hole,
   wherein, when the main cushion expands after the airbag is actuated, the sub-cushion protrudes from the main cushion while being expanded by the gas supplied through the flow hole,
   wherein, as the main cushion expands, the main cushion is deployed toward a front side of a vehicle between the driver's seat and the passenger seat, and the sub-cushion protrudes from a rear side of the main cushion toward a rear side of the vehicle,
   wherein the main cushion includes a structure in which a first panel facing the driver's seat and a second panel facing the passenger seat are connected to be left and right symmetrical based on a central folding line, and
   wherein the flow hole is formed in a structure that passes through a portion of each of the first panel and the second panel at the folding line.

2. The side airbag of claim 1, wherein a center of the flow hole is located on the folding line.

3. The side airbag of claim 1,
   wherein the sub-cushion is formed by flattening two cut sub-panels in contact with each other and sewing edges of the sub-panels; and
   wherein the side airbag further comprises a connecting hole formed in any one of the sub-panels, the connecting hole for connecting to the flow hole.

4. The side airbag of claim 3, wherein the sub-cushion is coupled to the main cushion by being joined along circumferences of the connecting hole and the flow hole in a state in which the connecting hole overlaps and is connected to the flow hole.

5. The side airbag of claim 1, further comprising:
   a tether that is provided inside the main cushion,
   wherein the tether limits an expansion thickness of the main cushion.

6. The side airbag of claim 5,
   wherein the tether is located at the same level as the flow hole or at a higher level than the flow hole based on a vertical direction of the main cushion, and
   wherein the tether is disposed in a long structure that extends left and right in a width direction of the main cushion.

7. The side airbag of claim 6, wherein the tether is deployed by the expansion of the main cushion and disrupts a flow of the gas so as to allow the gas to be supplied to the sub-cushion through the flow hole.

8. The side airbag of claim 1, further comprising:
   a diffuser pocket that is provided in the main cushion and accommodates an inflator,
   wherein the diffuser pocket is disposed below the flow hole.

9. The side airbag of claim 1,
   wherein, in a console mode in which a seatback of a center seat disposed between the driver's seat and the passenger seat is folded, the sub-cushion is located at a higher level than a back surface of the seatback, and
   wherein, in a backrest mode in which the seatback of the center seat is unfolded, the sub-cushion is located between the main cushion and a front surface of the seatback.

10. A side airbag installed on a side surface, which faces a driver's seat, of a seatback of a passenger seat, the side airbag comprising:
    a main cushion provided with a flow hole and expandable by gas; and
    a sub-cushion that is attached to the main cushion, the sub-cushion being connected to the flow hole,
    wherein, when the main cushion expands after the airbag is actuated, the sub-cushion protrudes from the main cushion while being expanded by the gas supplied through the flow hole,
    wherein, as the main cushion expands, the main cushion is deployed toward a front side of a vehicle between the driver's seat and the passenger seat, and the sub-cushion protrudes from a rear side of the main cushion toward a rear side of the vehicle,
    wherein the main cushion includes a structure in which a first panel facing the passenger seat and a second panel facing the driver's seat are connected to be left and right symmetrical based on a central folding line, and
    wherein the flow hole is formed in a structure that passes through a portion of each of the first panel and the second panel at the folding line.

11. The side airbag of claim 10, wherein a center of the flow hole is located on the folding line.

12. The side airbag of claim 10,
    wherein the sub-cushion is formed by flattening two cut sub-panels in contact with each other and sewing edges of the sub-panels; and
    wherein the side airbag further comprises a connecting hole formed in any one of the sub-panels, the connecting hole for connecting to the flow hole.

13. The side airbag of claim 12, wherein the sub-cushion is coupled to the main cushion by being joined along circumferences of the connecting hole and the flow hole in a state in which the connecting hole overlaps and is connected to the flow hole.

14. The side airbag of claim 10, further comprising:
a tether that is provided inside the main cushion,
wherein the tether limits an expansion thickness of the main cushion.

15. The side airbag of claim 14,
wherein the tether is located at the same level as the flow hole or at a higher level than the flow hole based on a vertical direction of the main cushion, and
wherein the tether is disposed in a long structure that extends left and right in a width direction of the main cushion.

16. The side airbag of claim 15, wherein the tether is deployed by the expansion of the main cushion and disrupts a flow of the gas so as to allow the gas to be supplied to the sub-cushion through the flow hole.

17. The side airbag of claim 10, further comprising:
a diffuser pocket that is provided in the main cushion and accommodates an inflator,
wherein the diffuser pocket is disposed below the flow hole.

18. The side airbag of claim 10,
wherein, in a console mode in which a seatback of a center seat disposed between the driver's seat and the passenger seat is folded, the sub-cushion is located at a higher level than a back surface of the seatback, and
wherein, in a backrest mode in which the seatback of the center seat is unfolded, the sub-cushion is located between the main cushion and a front surface of the seatback.

* * * * *